US012002420B2

(12) United States Patent
Chen et al.

(10) Patent No.: US 12,002,420 B2
(45) Date of Patent: Jun. 4, 2024

(54) COMPENSATION CIRCUIT, DRIVING METHOD AND DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventors: Yuwen Chen, Guangdong (CN); Zhongzhi Shen, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/051,286

(22) Filed: Oct. 31, 2022

(65) Prior Publication Data

US 2024/0119892 A1 Apr. 11, 2024

(30) Foreign Application Priority Data

Oct. 10, 2022 (CN) ........................ 202211234213.1

(51) Int. Cl.
*G09G 3/3208* (2016.01)

(52) U.S. Cl.
CPC ... *G09G 3/3208* (2013.01); *G09G 2300/0819* (2013.01); *G09G 2310/0291* (2013.01); *G09G 2320/0223* (2013.01); *G09G 2330/021* (2013.01)

(58) Field of Classification Search
CPC .................................................. G09G 3/3208
See application file for complete search history.

(56) References Cited

U.S. PATENT DOCUMENTS

2013/0069068 A1* 3/2013 Miyake ................ H01L 27/124 257/E27.12
2015/0171156 A1* 6/2015 Miyake .............. H01L 27/1225 257/43
2015/0187276 A1* 7/2015 Shim ................... G09G 3/3291 345/77

(Continued)

FOREIGN PATENT DOCUMENTS

CN 104751781 A 7/2015
CN 110036435 A 7/2019

(Continued)

OTHER PUBLICATIONS

Chinese Office Action issued in corresponding Chinese Patent Application No. 202211234213.1 dated May 24, 2023; with English translation; 24 pages provided.

(Continued)

*Primary Examiner* — William Boddie
*Assistant Examiner* — Andrew B Schnirel
(74) *Attorney, Agent, or Firm* — HSML P.C.

(57) ABSTRACT

Embodiments of the present disclosure are directed to a compensation circuit, a driving method and a display panel. In the compensation circuit, the driving method and the display panel, the compensation circuit with a 6T2C (6 transistors and 2 capacitors) structure is used to compensate the threshold voltage of the driving transistor in the pixel.

5 Claims, 6 Drawing Sheets

10

(56) References Cited

U.S. PATENT DOCUMENTS

| | | | | |
|---|---|---|---|---|
| 2016/0042694 | A1* | 2/2016 | Lim | G09G 3/3233 345/78 |
| 2016/0329392 | A1* | 11/2016 | Miyake | G09G 3/3233 |
| 2020/0320930 | A1* | 10/2020 | Toyotaka | H05B 33/14 |
| 2022/0415273 | A1 | 12/2022 | Chen | |

FOREIGN PATENT DOCUMENTS

| | | | |
|---|---|---|---|
| CN | 113284462 | A | 8/2021 |
| CN | 114360448 | A | 4/2022 |
| WO | 2021203476 | A1 | 10/2021 |

OTHER PUBLICATIONS

European Office Action issued in corresponding European Patent Application No. 22213784.6 dated Aug. 24, 2023, pp. 1-29.

* cited by examiner

COMPENSATION CIRCUIT, DRIVING METHOD AND DISPLAY PANEL

FIELD OF THE DISCLOSURE

The present disclosure relates to a display technology, and more particularly, to a compensation circuit, a driving method and a display panel.

BACKGROUND

Micro Light-Emitting Diodes (Micro-LEDs), Mini Light-Emitting Diodes (mini-LEDs) and Organic Light-Emitting Diodes (OLEDs) gradually become a popular research object in the display field due to their advantages of high color gamut, high contrast ratio and low power consumption. However, the common issue of Mini-LED, micro-LED and OLED is that the threshold voltage of the driving transistor in the pixel circuit will shift under long-term operating bias, which results in the luminance attenuation of the light-emitting device and uneven display. Enormous researches have been conducted for this issue. Conventionally, a compensation circuit is mainly used as a solution to compensate for the offset of the threshold voltage of the driving transistor.

However, the conventional compensation circuit has a narrow compensation range of the threshold voltage of the driving transistor. Thus, the compensation capability is insufficient when the threshold voltage shift is large.

SUMMARY

Technical Problem

One objective of an embodiment of the present disclosure is to provide a compensation circuit, a driving method and a display panel, to solve the issue that the conventional compensation circuit has a narrow compensation range of the threshold voltage of the driving transistor and its compensation capability is insufficient when the threshold voltage shift is large.

Technical Solution

According to an embodiment of the present disclosure, a compensation circuit is disclosed. The compensation circuit comprises a dual-gate transistor, a light emitting device, a first writing module, a second writing module, a reset module, and a voltage level control module.

The dual-gate transistor has a first gate electrically connected to a first node, a second gate electrically connected to a second node, a source electrically connected to the first power supply terminal, and a drain electrically connected to a third node.

The light emitting device is electrically connected between the third node and a second power supply terminal.

The first writing module receives a data signal and a first control signal and is electrically connected to the first node. The first writing module is configured to output the data signal to the first node in response to the first control signal.

The second writing module receives a writing signal and the first control signal and is electrically connected to the third node. The second writing module is configured to output the writing signal to the third node in response to the first control signal.

The reset module receives a first reset signal, a second reset signal, a second control signal and a third control signal and is electrically connected to the second node and the third node. The reset module is configured to output the first reset signal to the second node in response to the second signal and to output the second reset signal to the third node in response to the third control signal.

The voltage level control module receives the second control signal and is electrically connected to the first node and the third node. The voltage level control module is configured to maintain a voltage level of the first node to be identical to a voltage level of the third node in response to the second control signal.

In the compensation circuit, the first writing module comprises a first transistor, having a gate receiving the first control signal, a source receiving the data signal, and a drain electrically connected to the first node.

In the compensation circuit, the second writing module comprises a second transistor, having a gate receiving the first control signal, a source receiving the writing signal, and a drain electrically connected to the third node.

In the compensation circuit, the reset module comprises a third transistor, a fourth transistor and a first capacitor.

A gate of the third transistor receives the second control signal, a source of the third transistor receives the first reset signal, and a drain of the third transistor is electrically connected to the second node.

A gate of the fourth transistor receives the third control signal, a source of the fourth transistor receives the second reset signal, and a drain the fourth transistor is electrically connected to the third node.

A first end of the first capacitor is electrically connected to the second node, and a second end of the first capacitor is electrically connected to the third node.

In the compensation circuit, the voltage level control module comprises a fifth transistor and a second capacitor.

A gate of the fifth transistor receives the second control signal, a source of the fifth transistor is electrically connected to the first node, and a drain of the transistor is electrically connected to the third node.

A first end of the second capacitor is electrically connected to the first node, and a second end of the second capacitor is electrically connected to the third node.

In the compensation circuit, a current flowing through the light emitting device is independent of a threshold voltage of the dual gate transistor.

According to another embodiment of the present disclosure, a driving method for driving a compensation circuit is provided. The compensation circuit includes a dual-gate transistor, a light emitting device, a first transistor, a second transistor, a third transistor, a fourth transistor, a fifth transistor, a first capacitor, and a second capacitor.

The dual-gate transistor has a first gate electrically connected to a first node, a second gate electrically connected to a second node, a source electrically connected to a first power supply terminal, and a drain electrically connected to a third node.

The light emitting device is electrically connected between the third node and a second power supply terminal.

The first transistor has a gate receiving a first control signal, a source receiving a data signal, and a drain electrically connected to the first node.

The second transistor has a gate receiving the first control signal, a source receiving a writing signal, and a drain electrically connected to the third node.

The third transistor has a gate receiving a second control signal, a source of receiving a first reset signal, and a drain electrically connected to the second node.

The fourth transistor has a gate receiving a third control signal, a source receiving a second reset signal, and a drain electrically connected to the third node;

The fifth transistor has a gate receiving the second control signal, a source electrically connected to the first node, and a drain electrically connected to the third node.

The first capacitor is connected between the second node and the third node; and The second capacitor is connected between the first node and the third node.

The driving method comprises: in a reset stage, turning on a third transistor in response to a second control signal such that a first reset signal is output to the second node, and turning on a fourth transistor in response to a third control signal such that the second reset signal is output to a third node, and turning on a fifth transistor in response to the second control signal to maintain a voltage level of a first node to be identical to a voltage level of the third node; in a compensation stage, turning on the third transistor in response to the second control signal such that the first reset signal continues to be output to the second node, turning off the fourth transistor in response to the third control signal, turning on the fifth transistor in response to the second control signal to maintain the voltage level of the first node to be identical to the voltage level of the third node, and utilizing a first power supply terminal to charge the third node until a voltage difference between the second node and the third node is equal to a threshold voltage of a dual gate transistor; in a writing stage, turning on the first transistor and the second transistor in response to the first control signal such that the data signal is output to the first node and the writing signal is output to the third node; and in a light emitting stage, utilizing the light-emitting device to emit light.

In the driving method, the reset phase comprises a first reset phase and a second reset phase and the driving method further comprises: in the first reset stage, turning on the fourth transistor in response to the third control signal such that the second reset signal is output to the third node to reset the light-emitting device, and turning off the third transistor and the fifth transistor in response to the second control signal; in the second reset stage, turning on the third transistor and the fifth transistor in response to the second control signal such that the first reset signal is output to the second node and the first reset signal is output to the second node to maintain the voltage level of the first node to be identical to the voltage level of the third node, and turning on the fourth transistor in response to the third control signal such that and the second reset signal continues to be output to the third node.

The driving method further comprises: in a buffer stage, slowly decreasing the second control signal decreased from a high voltage level to a low voltage level. The buffer stage is between the compensation stage and the writing stage.

Furthermore, the double-gate transistor, the first, second, third, fourth and fifth transistors are low temperature polysilicon thin-film transistors, oxide semiconductor thin-film transistors or an amorphous silicon thin-film transistors.

Furthermore, the double-gate transistor, and the first, second, third, fourth and fifth transistors are the same type transistors.

Furthermore, current flowing through the light emitting device is independent of a threshold voltage of the dual gate transistor.

According to another embodiment of the present disclosure, a display panel is disclosed. The display panel comprises a plurality of pixels arranged in an array. Each of the pixels comprises a compensation circuit that comprises a dual-gate transistor, a light emitting device, a first writing module, a second writing module, a reset module, and a voltage level control module.

The dual-gate transistor has a first gate electrically connected to a first node, a second gate electrically connected to a second node, a source electrically connected to the first power supply terminal, and a drain electrically connected to a third node.

The light emitting device is electrically connected between the third node and a second power supply terminal.

The first writing module receives a data signal and a first control signal and is electrically connected to the first node. The first writing module is configured to output the data signal to the first node in response to the first control signal.

The second writing module receives a writing signal and the first control signal and is electrically connected to the third node. The second writing module is configured to output the writing signal to the third node in response to the first control signal.

The reset module receives a first reset signal, a second reset signal, a second control signal and a third control signal and is electrically connected to the second node and the third node. The reset module is configured to output the first reset signal to the second node in response to the second signal and to output the second reset signal to the third node in response to the third control signal.

The voltage level control module receives the second control signal and is electrically connected to the first node and the third node. The voltage level control module is configured to maintain a voltage level of the first node to be identical to a voltage level of the third node in response to the second control signal.

In the display panel, the first writing module comprises a first transistor, having a gate receiving the first control signal, a source receiving the data signal, and a drain electrically connected to the first node.

In the display panel, the second writing module comprises a second transistor, having a gate receiving the first control signal, a source receiving the writing signal, and a drain electrically connected to the third node.

In the display panel, the reset module comprises a third transistor, a fourth transistor and a first capacitor.

A gate of the third transistor receives the second control signal, a source of the third transistor receives the first reset signal, and a drain of the third transistor is electrically connected to the second node.

A gate of the fourth transistor receives the third control signal, a source of the fourth transistor receives the second reset signal, and a drain the fourth transistor is electrically connected to the third node.

A first end of the first capacitor is electrically connected to the second node, and a second end of the first capacitor is electrically connected to the third node.

In the display panel, the voltage level control module comprises a fifth transistor and a second capacitor.

A gate of the fifth transistor receives the second control signal, a source of the fifth transistor is electrically connected to the first node, and a drain of the transistor is electrically connected to the third node.

A first end of the second capacitor is electrically connected to the first node, and a second end of the second capacitor is electrically connected to the third node.

In the display panel, a current flowing through the light emitting device is independent of a threshold voltage of the dual gate transistor.

Advantageous Effect

In the compensation circuit, the driving method and display panel disclosed in the present disclosure, a compensation circuit with a 6T2C (6 transistors and 2 capacitors) structure is used to compensate the threshold voltage of the driving transistor in the pixel. In contrast to the conventional compensation structure, the compensation circuit of the present disclosure could compensate for the wider drift range of the threshold voltage of the driving transistor and has a higher compensation accuracy. Furthermore, the compensation circuit of the present disclosure does not require a negative voltage source, so that the cost can be reduced. In addition, the compensation circuit can also adjust the pulse width of the first control signal, so that the voltage level of the first node can reach a high voltage level when the voltage level of the data signal is higher, thereby solving the issue of insufficient charging.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

The following reference to the accompanying drawings of the present disclosure introduces preferred embodiments of the present disclosure, proving that the present disclosure may be implemented, the embodiment of the invention may be a complete introduction to those skilled in the art of the present disclosure, so that its technical content is more clear and easy to understand. The present disclosure may be embodied by many different forms of embodiments of the present disclosure, the scope of protection of the present disclosure is not limited to the embodiments referred to herein.

The transistors disclosed in all the embodiments of the present disclosure may be thin-film transistors, field effect transistors, or any other devices with the same characteristics. Since the source and drain of the transistor are symmetrical, the source and drain are interchangeable. In the following embodiments, in order to distinguish the two electrodes of the transistor except for the gate, one electrode is called the source electrode, and the other electrode is called the drain electrode.

In addition, the transistors in the following embodiments may include P-type transistors and/or N-type transistors. Here, a P-type transistor is turned on when the gate is at a low voltage level and is turned off when the gate is at a high voltage level. An N-type transistor is turned on when the gate is at a high voltage level and is turned off when the gate is at a low voltage level.

Figure 1:
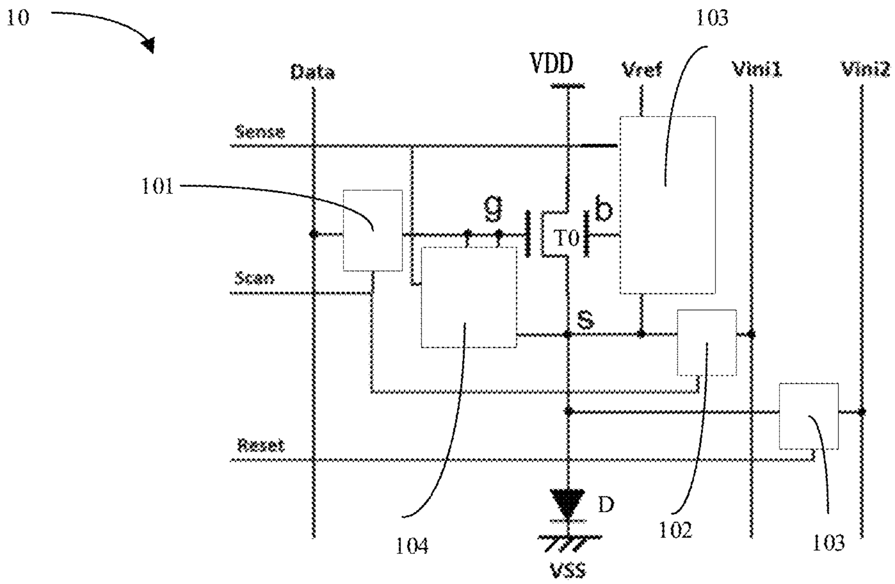
FIG. 1 is a block diagram of a compensation circuit according to an embodiment of the present disclosure.

Please refer to FIG. 1. FIG. 1 is a schematic diagram of a compensation circuit according to an embodiment of the present disclosure. In this embodiment, the compensation circuit comprises a dual-gate transistor T0, a light emitting device D, a first writing module 101, a second writing module 102, a reset module 103 and a voltage level control module 104.

The dual gate transistor T0 is a driving transistor in the compensation circuit. The dual gate transistor T0 is a four-terminal device that includes two gates, a source, and a drain. The equivalent gate-drain voltage of the double gate transistor T0 satisfies the following relationship: $V=Vgs-a*Vbs$, where V is the equivalent gate-drain voltage of the double gate transistor T0, and Vgs is voltage difference between one gate and the drain, Vbs is the voltage difference between the other gate and the drain, and a is a constant.

The light-emitting device D can be a Micro-LED, a mini-LED or an OLED. The light-emitting device D may include a Micro-LED, a Mini-LED or an OLED. In other embodiments, the light-emitting device D may include a plurality of Micro-LEDs, a plurality of Mini-LEDs or a plurality of OLEDs. The plurality of Micro-LEDs, Mini-LEDs or OLEDs may be connected in series or in parallel.

The first gate of the dual-gate transistor T0 is electrically connected to the first node g. The second gate of the dual-gate transistor T0 is electrically connected to the second node b. The source of the double-gate transistor T1 is electrically connected to the first power supply terminal VDD. The drain of the dual-gate transistor T0 is electrically connected to the third node s. The first end of the light emitting device D is electrically connected to the third node s. The second terminal of the light emitting device D is electrically connected to the second power terminal VSS. The first writing module 101 receives the data signal Data and the first control signal Scan and is electrically connected to the first node g. The second writing module 102 receives the writing signal Vini1 and the first control signal Scan and is electrically connected to the third node s. The reset module 103 receives the first reset signal Vref, the second reset signal Vini2, the second control signal Sense and the third control signal Reset and is electrically connected to the second node b and the third node s. The voltage level control module 104 receives the second control signal Sense and is electrically connected to the first node g and the third node s.

The first writing module 101 is configured to output the data signal Data to the first node g in response to the first control signal Scan. The second writing module 102 is configured to output the writing signal Vini1 to the third node s in response to the second control signal Sense. The reset module 103 is configured to output the first reset signal Vref to the second node b in response to the second control signal Sense. The reset module 103 is further configured to output the second reset signal Vini2 to the third node s in response to the third control signal Reset. The voltage level control module 104 is configured to maintain the voltage level of the first node g to be identical to the voltage level of the third node s in response to the second control signal Sense.

The first node g, the second node b and the third node s represent nodes electrically connected to corresponding devices. Thus, these nodes are merely used to represent their electrical connection relationships here and each of the first node g, the second node b and the third node s is Not indicated as a terminal.

Figure 2:
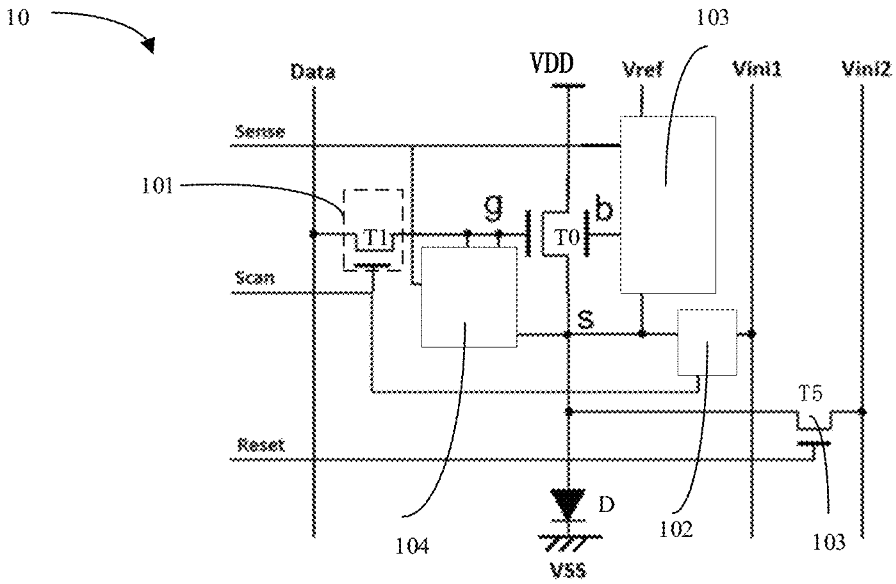
FIG. 2 is a first circuit schematic diagram of a compensation circuit according to an embodiment of the present disclosure.

Please refer to FIG. 2. FIG. 2 is a first circuit schematic diagram of a compensation circuit according to an embodiment of the present disclosure. The first writing module 101 comprises a first transistor T1. The gate of the first transistor T1 receives the first control signal Scan. The source of the first transistor T1 receives the data signal Data. The drain of the first transistor T1 is electrically connected to the first node g. It should be noted that the circuit structure of the first writing module 101 in the compensation circuit in this embodiment is only an example. It should be understood that the first writing module 101 may also be implemented with multiple transistors connected in series.

Figure 3:
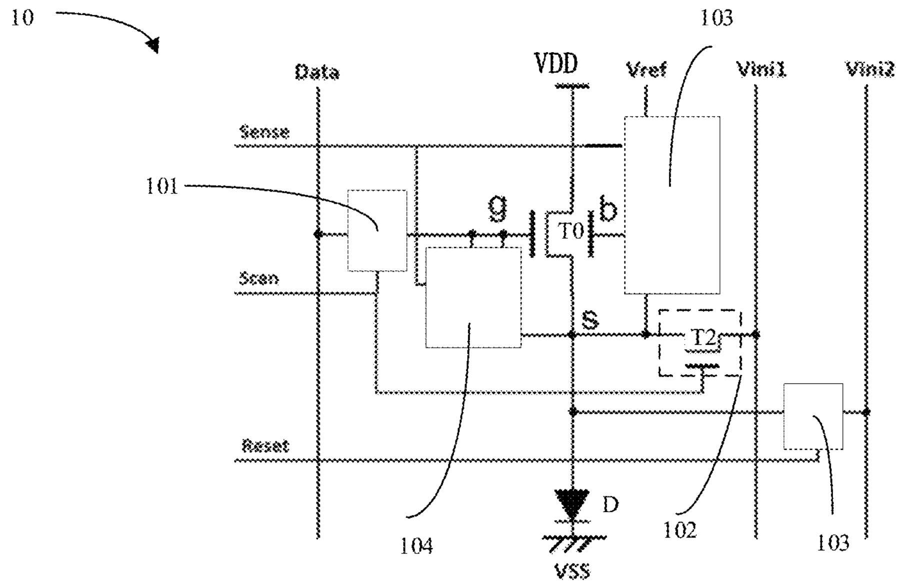
FIG. 3 is a second circuit schematic diagram of a compensation circuit according to an embodiment of the present disclosure.

Please refer to FIG. 3. FIG. 3 is a second circuit schematic diagram of a compensation circuit according to an embodiment of the present disclosure. The second writing module 102 comprises a second transistor T2. The gate of the second transistor T2 receives the first control signal Scan. The source of the second transistor T2 receives the writing signal Vini1. The drain of the second transistor T2 is electrically connected to the third node s. It should be noted that the circuit structure of the second writing module 102 in the compensation circuit in this embodiment is only an example. It should be understood that the second writing module 102 may also be implemented with multiple transistors connected in series.

Figure 4:
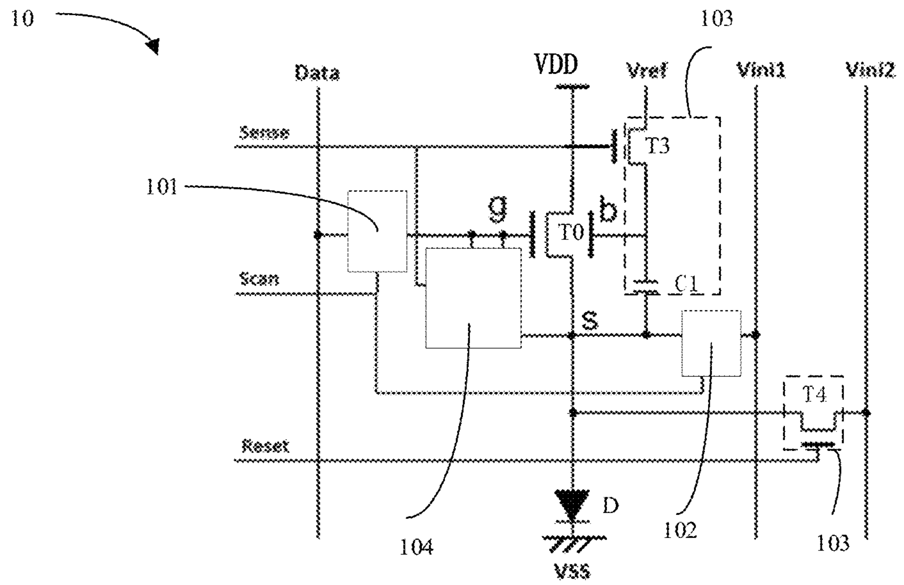
FIG. 4 is a third circuit schematic diagram of a compensation circuit according to an embodiment of the present disclosure.

Please refer to FIG. 4. FIG. 4 is a third circuit schematic diagram of a compensation circuit according to an embodiment of the present disclosure. The reset module 103 includes a third transistor T3, a fourth transistor T4 and a first capacitor C1. The gate of the third transistor T3 receives the second control signal Sense. The source of the third transistor T3 receives the first reset signal Vref. The drain of the third transistor T3 is electrically connected to the second node b. The gate of the fourth transistor T4 receives the third control signal Reset. The source of the fourth transistor T4 receives the second reset signal Vini2. The drain of the fourth transistor T4 is electrically connected to the third node s. The first end of the first capacitor C1 is electrically connected to the second node b. The second end of the first capacitor C1 is electrically connected to the third node s. It should be noted that the circuit structure of the reset module 103 in the compensation circuit in this embodiment is only an example. It should be understood that the reset module 103 may also be implemented with multiple transistors connected in series.

Figure 5:
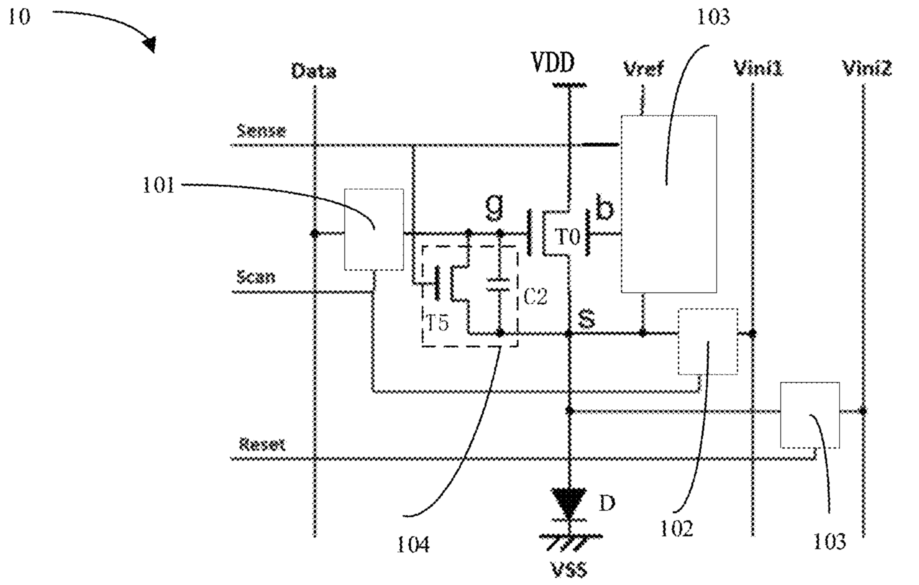
FIG. 5 is a fourth circuit schematic diagram of a compensation circuit according to an embodiment of the present disclosure.

Please refer to FIG. 5. FIG. 5 is a fourth circuit schematic diagram of a compensation circuit according to an embodiment of the present disclosure. The voltage level control module 104 comprises a fifth transistor T5 and a second capacitor C2. The gate of the fifth transistor T5 receives the second control signal Sense. The source of the fifth transistor T5 is electrically connected to the first node g. The drain of the fifth transistor T5 is electrically connected to the third node s. The first end of the second capacitor C2 is electrically connected to the first node g. The second end of the second capacitor C2 is electrically connected to the third node s. It should be noted that the circuit structure of the voltage level control module 104 in the compensation circuit in this embodiment is only an example. It should be understood that the voltage level control module 104 may also be implemented with multiple transistors connected in series.

Figure 6:
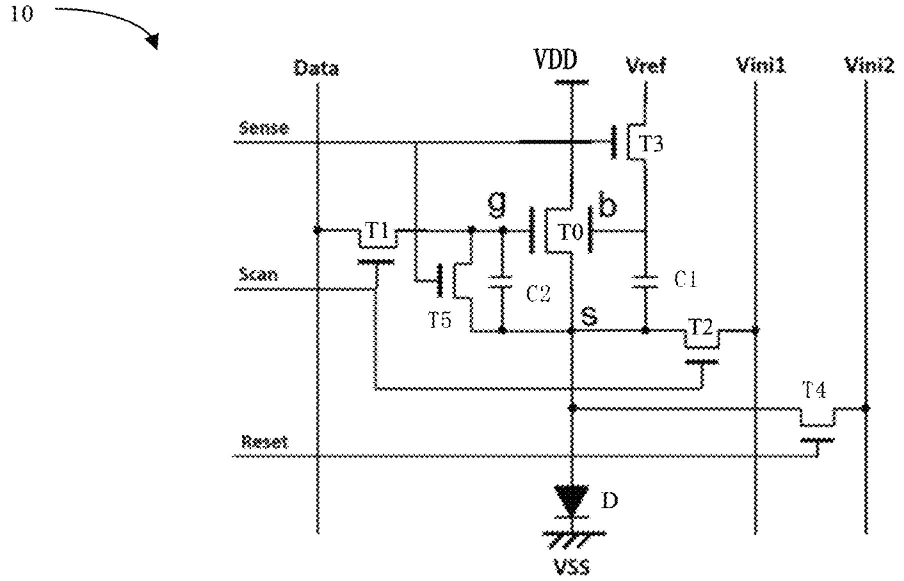
FIG. 6 is a fifth circuit schematic diagram of a compensation circuit according to an embodiment of the present disclosure.

Please refer to FIG. 6. FIG. 6 is a fifth circuit schematic diagram of a compensation circuit according to an embodiment of the present disclosure. In this embodiment, the compensation circuit comprises a dual gate transistor T0, a light-emitting device D, a first transistor T1, a second transistor T2, a third transistor T3, and a fourth transistor T4, a fifth transistor T5, a first capacitor C1 and a second capacitor C2.

It should be noted that one or more of the dual-gate transistor T0, the first transistor T1, the second transistor T2, the third transistor T3, the fourth transistor T4 and the fifth transistor T5 may be a low temperature polysilicon thin-film transistor, an oxide semiconductor thin-film transistor or an amorphous silicon thin-film transistor. In some embodiments, the transistors in the compensation circuit may be the same type of transistor, so as to avoid the influence of the difference between different types of transistors on the compensation circuit.

The first gate of the dual-gate transistor T0 is electrically connected to the first node g. The second gate of the dual-gate transistor T0 is electrically connected to the second node b. The source of the dual-gate transistor T0 is electrically connected to the first power supply terminal VDD. The drain of the dual-gate transistor T0 is electrically connected to the third node s. The first end of the light emitting device D is electrically connected to the third node s. The second end of the light emitting device D is electrically connected to the second power terminal VSS. The gate of the first transistor T1 receives the first control signal Scan. The source of the first transistor T1 receives the data signal Data. The drain of the first transistor T1 is electrically connected to the first node g. The gate of the second transistor T2 receives the first control signal Scan. The source of the second transistor T2 receives the writing signal Vini1. The drain of the second transistor T2 is electrically connected to the third node s. The gate of the third transistor T3 receives the second control signal Sense. The source of the third transistor T3 receives the first reset signal Vref. The drain of the third transistor T3 is electrically connected to the second node b. The gate of the fourth transistor T4 receives the third control signal Reset. The source of the fourth transistor T4 receives the second reset signal Vini2. The drain of the fourth transistor T4 is electrically connected to the third node s. The first end of the first capacitor C1 is electrically connected to the second node b. The second end of the first capacitor C1 is electrically connected to the third node s. The gate of the fifth transistor T5 receives the second control signal Sense. The source of the fifth transistor T5 is electrically connected to the first node g. The drain of the fifth transistor T5 is electrically connected to the third node s. The first end of the second capacitor C2 is electrically connected to the first node g. The second end of the second capacitor C2 is electrically connected to the third node s.

Figure 7:
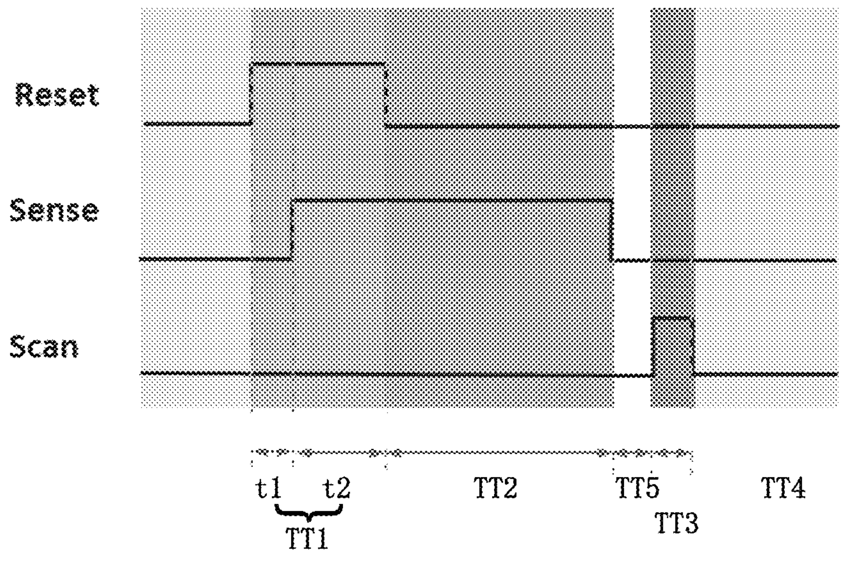
FIG. 7 is a timing diagram of the compensation circuit shown in FIG. 6.

Please refer to FIG. 7. FIG. 7 is a timing diagram of the compensation circuit shown in FIG. 6. The driving timing sequence of the compensation circuit comprises a reset phase TT1, a compensation phase TT2, a writing phase TT3, and a light-emitting phase TT4.

In the reset phase TT1, the first transistor T1 is turned off in response to the first control signal Scan. The second transistor T2 is turned off in response to the first control signal Scan. The third transistor T3 is first turned on and then turned off in response to the second control signal Sense. The first reset signal Vref is output to the second node b. The fourth transistor T4 is turned on in response to the third control signal Reset, and the second reset signal Vini2 is output to the third node s. The fifth transistor T5 is first turned on and then turned off in response to the second control signal Sense, and the first node g and the second node b are maintained to have the same voltage level.

Specifically, the reset phase TT1 comprises a first reset phase t1 and a second reset phase t2. In the first reset phase t1, the first transistor T1 is turned off in response to the first control signal Scan. The second transistor T2 is turned off in response to the first control signal Scan. The third transistor T3 is turned off in response to the second control signal Sense. The fourth transistor T4 is turned on in response to the third control signal Reset, and the second reset signal Vini2 is output to the third node s. The fifth transistor T5 is turned off in response to the second control signal Sense. In the second reset phase t2, the first transistor T1 is turned off in response to the first control signal Scan. The second transistor T2 is turned off in response to the first control signal Scan. The third transistor T3 is turned on in response to the second control signal Sense, and the first reset signal Vref is output to the second node b. The fourth transistor T4 is turned on in response to the third control signal Reset, and the second reset signal Vini2 is output to the third node s. The fifth transistor T5 is turned on in response to the second control signal Sense, and the first node g and the third node s are maintained to have the same voltage level.

In the reset phase TT1, the third control signal Reset is at a high voltage level, the fourth transistor T4 is turned on in response to the third control signal Reset, and the second reset signal Vini2 is output to the third node s, so that the first terminal of the light-emitting device D is initialized. Subsequently, the second control signal Sense is transited from a low voltage level to a high voltage level, the third transistor T3 is turned on in response to the second control signal Sense, and the first reset signal Vref is output to the second node b, so that the second gate of the dual-gate transistor T0 is reset to the voltage level of the first reset signal Vref. At the same time, the fifth transistor T5 is turned on in response to the second control signal Sense, so that the first node g and the third node s are maintained to have the same voltage level. That is, in this embodiment, the timing is set so that the third node s is not affected by the voltage level of the first node g when the third node s is reset.

In the compensation phase TT2, the first transistor T1 is turned off in response to the first control signal Scan. The second transistor T2 is turned off in response to the first control signal Scan. The third transistor T3 continues to be turned on in response to the second control signal Sense, and the first reset signal Vref continues to be output to the second node b. The fourth transistor T4 is turned off in response to the third control signal Reset. The fifth transistor T5 continues to be turned on in response to the second control signal Sense, and the first node g and the second node b are maintained to have the same voltage level. The first power supply terminal VDD charges the third node s until the voltage difference between the second node b and the third node s is equal to the threshold voltage of the dual-gate transistor T0.

In the writing phase TT3, the first transistor T1 is turned on in response to the first control signal Scan, and the data signal Data is output to the first node g. The second transistor T2 is turned on in response to the first control signal Scan, and the writing signal Vini1 is output to the third node s. The third transistor T3 is turned off in response to the second control signal Sense. The fourth transistor T4 is turned off in response to the third control signal Reset. The fifth transistor T5 is turned off in response to the second control signal Sense. At this time, the voltage difference between the first gate and the drain of the dual-gate transistor T0 is equal to the voltage difference between the data signal Data and the writing signal Vini1.

In the light emitting stage TT4, the light emitting device D emits light. Since the dual-gate transistor T0 is a four-terminal device containing two gates. The equivalent gate-drain voltage satisfies the following relationship: $V=Vgs-a*Vbs$, where V is the equivalent gate-drain voltage of the dual-gate transistor T1, Vgs is the voltage difference between the first gate and the drain of the dual-gate transistor T0, Vbs is the voltage difference between the second gate and the drain of the double-gate transistor T0, and a is a constant.

According to the driving current formula: $I=k(V-Vth)^2$, where k is a constant. That is, $I=k(Vgs-a*Vbs-Vth)^2=k(Vdata-Vini1)^2$. It can be seen that, according to the formula, the current flowing through the light emitting device D becomes not relative to the threshold voltage of the dual-gate transistor T0.

In addition, the driving timing sequence of the compensation circuit in this embodiment further comprises a buffer stage TT5. The buffer stage TT5 is between the compensation phase T2 and the writing phase T3. In the buffer stage TT5, the second control signal Sense gradually decreases from a high voltage level to a low voltage level. In the actual display panel, the wiring connected to the second control signal Sense will be affected by the RC delay. Thus, when it changes from a high voltage level to a low voltage level, it actually decreases slowly. In order to ensure that the signals at each stage are not affected by other signals. In general, it takes a period of time to enter the writing stage TT3 to ensure that the signal line connected to the second control signal Sense is completely switched from a high voltage level to a low voltage level, and then the signal line connected to the first control signal Scan is turned on.

In an embodiment, the compensation circuit adopts a compensation circuit with a 6T2C (6 transistors and 2 capacitors) structure is used to compensate the threshold voltage of the driving transistor in the pixel. In contrast to the conventional compensation structure, the compensation circuit of this embodiment could compensate for the wider drift range of the threshold voltage of the driving transistor and has a higher compensation accuracy. Furthermore, the compensation circuit of this embodiment does not require a negative voltage source, so that the cost can be reduced. In addition, the compensation circuit can also adjust the pulse width of the first control signal Scan, so that the voltage level of the first node g can reach a high voltage level when the voltage level of the data signal Data is higher, thereby solving the issue of insufficient charging.

Figure 8:
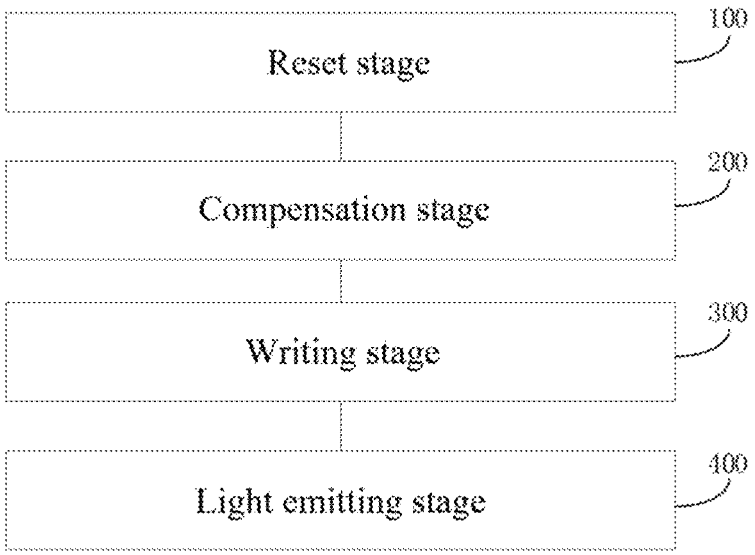
FIG. 8 is a flow chart of a driving method according to a first embodiment of the present disclosure.

Please refer to FIG. 8. FIG. 8 is a flowchart of a driving method according to a first embodiment of the present disclosure. As shown in FIG. 6, FIG. 7 and FIG. 8, the driving method of the present disclosure is used in the above-mentioned compensation circuit. The driving method comprises Step 100, Step 200, Step 300 and Step 400.

In the reset stage TT1, the third transistor T4 is turned on in response to the second control signal Sense, the first reset signal Vref is output to the second node b, the fourth transistor T4 is turned on in response to the control signal Reset, the second reset signal Vini2 is output to the third node s, the fifth transistor T5 is turned on in response to the second control signal Sense, and the first node g and the third node s are maintained to have the same voltage level.

In the compensation stage TT2, the third transistor T3 is turned on in response to the second control signal Sense, the first reset signal Vref continues to be output to the second node b, the fourth transistor T4 is turned off in response to the third control signal Reset, the fifth transistor T5 is turned on in response to the second control signal Sense, the first node g and the third node s are maintained to have the same voltage level, and the first power supply terminal VDD charges the third node s until the voltage difference between the second node b and the third node s is equal to the threshold voltage of the dual-gate transistor T0.

In the writing stage TT3, the first transistor T1 and the second transistor T2 are turned on in response to the first control signal Scan, the data signal Data is output to the first node g, and the writing signal Vini1 is output to the third node s.

In the light-emitting stage TT4, the light-emitting device D emits light.

Figure 9:
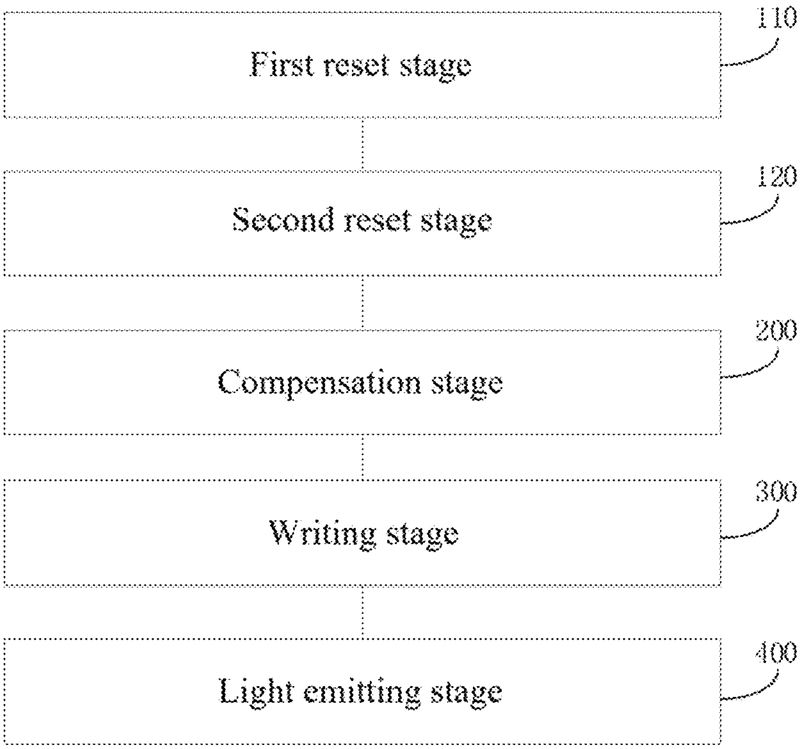
FIG. 9 is a flow chart of a driving method according to a second embodiment of the present disclosure.

Please refer to FIG. 9. FIG. 9 is a flow chart of a driving method according to a second embodiment of the present disclosure. Step 100 comprises Step 110 and Step 120. The reset stage T11 comprises the first reset phase t1 and the second reset phase t2. In the first reset phase t1, the fourth transistor T5 is turned on in response to the third control signal Reset, the second reset signal Vini2 is output to the third node s to reset the light emitting device D, and the third transistor T3 and the fifth transistor T5 are turned off in response to the second control signal Sense. In the second reset phase t2, the third transistor T3 and the fifth transistor T5 are turned on in response to the second control signal Sense, the first reset signal Vref is output to the second Node b, the first node g and the third node s are maintained to have the same voltage level, the fourth transistor T4 is turned on in response to the third control signal Reset, and the second reset signal Vini2 continues to be output to the third node s.

Figure 10:
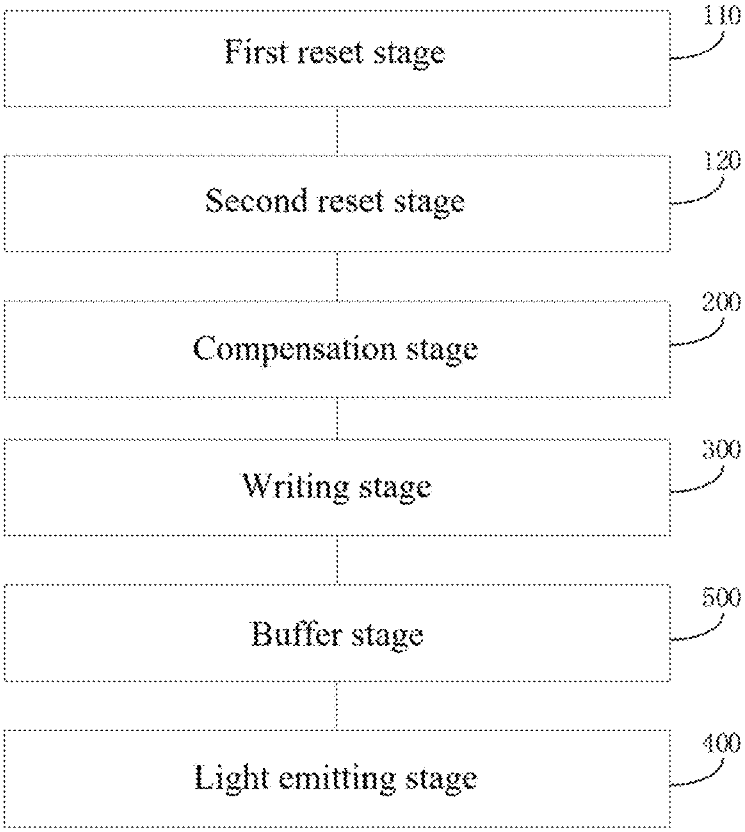
FIG. 10 is a flow chart of a driving method according to a third embodiment of the present disclosure.

Please refer to FIG. 10. FIG. 10 is a flow chart of a driving method according to a third embodiment of the present disclosure. The driving method further comprises Step 500. The driving method further includes a buffer stage TT5. The buffer stage TT5 is between the compensation stage TT2 and the writing stage TT3. In the buffer stage TT5, the second control signal Sense slowly decreases from a high voltage level to a low voltage level.

Figure 11:
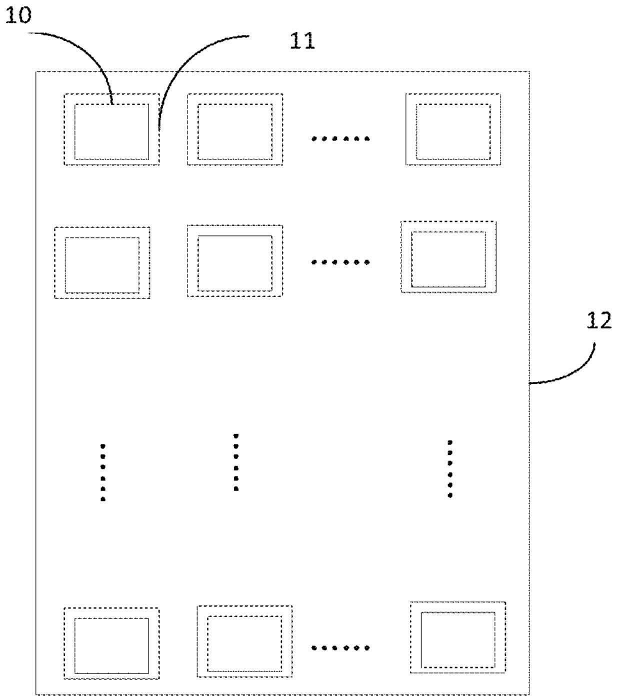
FIG. 11 is a schematic diagram of a display panel according to an embodiment of the present disclosure.

Please refer to FIG. 11. FIG. 11 is a schematic diagram of a display panel according to an embodiment of the present disclosure. A display panel 12 is disclosed according to an embodiment of the present disclosure. The display panel 12 comprises a plurality of pixels 11 arranged in an array. Each of the pixels 11 comprises a compensation circuit 10. The details of the compensation circuit 10 could be referred to the description of the aforementioned compensation circuit 10 and are omitted here for simplicity.

In the compensation circuit, the driving method and display panel disclosed in the present disclosure, a compensation circuit with a 6T2C (6 transistors and 2 capacitors) structure is used to compensate the threshold voltage of the driving transistor in the pixel. In contrast to the conventional compensation structure, the compensation circuit of the present disclosure could compensate for the wider drift range of the threshold voltage of the driving transistor and has a higher compensation accuracy. Furthermore, the compensation circuit of the present disclosure does not require a negative voltage source, so that the cost can be reduced. In addition, the compensation circuit can also adjust the pulse width of the first control signal, so that the voltage level of the first node can reach a high voltage level when the voltage level of the data signal is higher, thereby solving the issue of insufficient charging.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A driving method for driving a compensation circuit, the compensation circuit comprising:

a dual-gate transistor, having a first gate electrically connected to a first node, a second gate electrically connected to a second node, a source electrically connected to a first power supply terminal, and a drain electrically connected to a third node;

a light emitting device, electrically connected between the third node and a second power supply terminal;

a first transistor, having a gate receiving a first control signal, a source receiving a data signal, and a drain electrically connected to the first node;

a second transistor, having a gate receiving the first control signal, a source receiving a writing signal, and a drain electrically connected to the third node;

a third transistor, having a gate receiving a second control signal, a source of receiving a first reset signal, and a drain electrically connected to the second node a fourth transistor, having a gate receiving a third control signal, a source receiving a second reset signal, and a drain electrically connected to the third node;

a fifth transistor, having a gate receiving the second control signal, a source electrically connected to the first node, and a drain electrically connected to the third node;

a first capacitor, connected between the second node and the third node; and a second capacitor, connected between the first node and the third node;

wherein the driving method comprises:

in a first reset stage, turning on the fourth transistor in response to the third control signal such that the second reset signal is output to the third node to reset the light-emitting device, and turning off the third transistor and the fifth transistor in response to the second control signal;

in a second reset stage, turning on the third transistor and the fifth transistor in response to the second control signal such that the first reset signal is output to the second node and the first reset signal is output to the second node to maintain the voltage level of the first node to be identical to the voltage level of the third node, and turning on the fourth transistor in response to the third control signal such that and the second reset signal continues to be output to the third node;

in a compensation stage, turning on the third transistor in response to the second control signal such that the first reset signal continues to be output to the second node, turning off the fourth transistor in response to the third control signal, turning on the fifth transistor in response to the second control signal to maintain the voltage level of the first node to be identical to the voltage level of the third node, and utilizing a first power supply terminal to charge the third node until a voltage difference between the second node and the third node is equal to a threshold voltage of a dual gate transistor;

in a writing stage, turning on the first transistor and the second transistor in response to the first control signal such that the data signal is output to the first node and the writing signal is output to the third node; and in a light emitting stage, utilizing the light-emitting device to emit light.

2. The driving method according to claim 1, further comprising:

in a buffer stage, slowly decreasing the second control signal decreased from a high voltage level to a low voltage level;

wherein the buffer stage is between the compensation stage and the writing stage.

3. The driving method according to claim 1, wherein the double-gate transistor, the first, second, third, fourth and fifth transistors are low temperature polysilicon thin-film transistors, oxide semiconductor thin-film transistors or amorphous silicon thin-film transistors.

4. The driving method according to claim 3, wherein the double-gate transistor, and the first, second, third, fourth and fifth transistors are the same type transistors.

5. The driving method according to claim 1, wherein current flowing through the light emitting device is independent of a threshold voltage of the dual gate transistor.

* * * * *